2,910,756
QUICK ACTING FASTENER ASSEMBLY

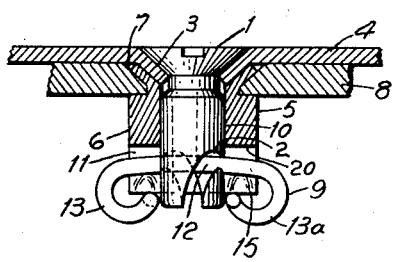
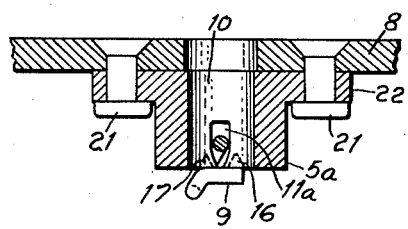
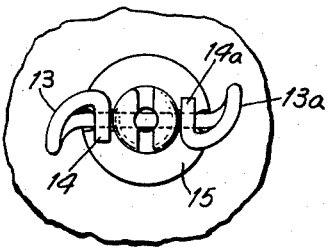
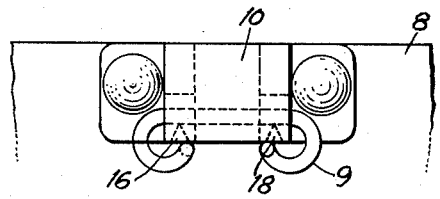
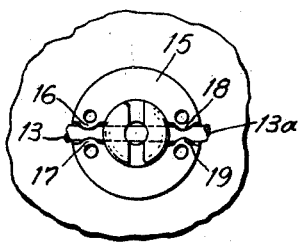
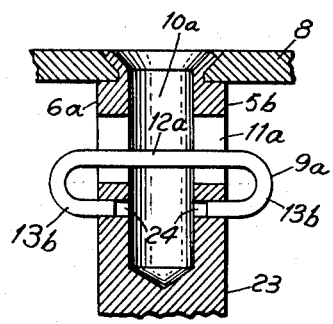
Inventors
MARTIN T. SMID
ADAM BECKER

Martin T. Smid, West Paterson, and Adam Becker, Elizabeth, N.J., assignors to International Telephone and Telegraph Corporation, Nutley, N.J., a corporation of Maryland Application May 8, 1957, Serial No. 657,905

2 Claims. (Cl. 24—221)

This invention relates to an improvement in a quick acting fastener assembly, and more particularly to a receptacle for a quick acting fastener wherein a stud with cam action engages a spring.

There are numerous instances in which quick acting fasteners are required where space is limited and available commercial fasteners are too large to be used. Particularly is this so in the electronic industry where miniaturization of components is being carried out extensively and the packages for such components become smaller. There are also cases where even in standard size packages and containers it is necessary, because of restricted space, to use smaller quick acting fasteners than are commercially available. Heretofore it has been necessary to devise small special fasteners capable of assembly in limited space and this has, therefore, required extensive and time consuming specially fabricated parts.

It is, therefore, an object of this invention to provide a small quick acting fastener which can be utilized in limited space.

A feature of this invention is a receptacle member for co-active fastening with a cam locking stud member which comprises a body having a first recess adapted to receive the stud member, and a second recess disposed cross-wise and in intersecting relation with the first recess. A spring is partially disposed within the second recess to allow engagement thereof by the cam action of the stud, and the end loop portions of the spring are disposed outside of the second recess with the straight terminating portions thereof in contact with the receptacle body and held in place thereon.

The above mentioned and other features and objects of this invention and the manner of obtaining them will become more apparent by reference to the following description taken in conjunction with the following drawings, of which:

Fig. 1 is a side elevation in section of one embodiment of our invention showing the complete assembly of stud and receptacle;

Fig. 1A is a bottom view of Fig. 1;

Fig. 1B is a view similar to Fig. 1A with portions of the spring cut away;

Fig. 2 is another embodiment showing a receptacle adapted to be riveted to the part that is to be fastened;

Fig. 3 is still another embodiment showing a receptacle adapted to be riveted wherein the recess is disposed 90 degrees from the embodiment shown in Fig. 2; and Fig. 4 is another embodiment adapted to tubes and the like.

With reference to Figs. 1, 1A and 1B there is shown a stud 1 with cam locking means 2 on one end, retained in a dimpled hole 3 in a first sheet or plate 4. The receptacle 5 consists of a body 6 which is spun over, or clinched, at 7 in a second sheet or plate 8, which is to be fastened to the first sheet 4, and a spring 9 which is disposed in the body 6. The body 6 includes a recess or axial opening 10 which is adapted to receive the stud 1 and a recess 11 cross-wise of and intersecting recess 10. Spring 9 comprises a central straight portion 12 which is received in the recess 11, transversely of recess 10, and two looped back end portions 13 and 13a. The looped ends 13 and 13a terminate in straight sections 14 and 14a which are transverse to the central portion 12. Straight sections 14 and 14a are disposed on the end surface 15 of body 5 and the straight portion 12 is retained within the recess 11 by staked-over portions 16, 17, 18 and 19 of body 5 which displaces the material to at least partially close the opening of recess 11 in surface 15. The straight portion 12 is thus kept at the correct depth within the recess 10 to be engaged by the cam action of stud 1. The recess 11 is made sufficiently deep so that when the spring section 12 is drawn upwards towards the plate 8, axially of the recess 10, by the cam action of the stud 1 the spring section 12 will not bottom on the surface 20 of the recess 11 before the fastening engagement is completed. The straight terminations 14 and 14a are the fulcrums of the leverage force exerted by the stud 1 on the spring 9. The loop sections 13 and 13a supply the necessary resilience to the spring 9.

Fig. 2 discloses an embodiment wherein the receptacle 5a has a flange 22 and is fastened to the plate 8 by rivets 21. The recess 11a is rotated 90 degrees to allow clearance for the assembly riveting operation without interference by the spring 9. In Fig. 3 another version of the flange receptacle is shown but here the axis of recess 10 is parallel with the plate 8 and not transverse thereto as in Figs. 1 and 2.

Fig. 4 shows an embodiment wherein the receptacle 5b is a tube or solid rod 23, though it is to be understood it may be of any similar configuration, and the recess 10a is bored in the rod 23 to the desired depth. It is to be understood that the recess 10a may be drilled through the entire length of body 6a if the receptacle 5a is made short enough. Recess 11a is drilled through the tube 23 transversely of recess 10a. A spring 9a having a straight central portion 12a and preformed looped back ends 13b is pushed through the recess 11a and the looped ends 13b inserted in holes 24 by assembly methods well known to those skilled in the art, thus retaining spring 9a in place within the recess 11a. This embodiment is particularly adapted to containers especially of the cast variety where the receptacle body 6a can be cast as a boss and the recess 10a can also be included in the casting process. The final drilling operations can be done by the usual machining methods. It is evident that in this embodiment the space occupied by the receptacle is at a minimum and the spring 9a has been simplified over the embodiment of Figs. 1, 2 and 3.

While we have described above the principles of our invention in connection with specific embodiments, it is to be clearly understood that this description is made only by way of example and not as a limitation to the scope of our invention as set forth in the objects thereof and in the accompanying claims.

We claim:

1. A fastener assembly comprising a stud member, a receptacle member, and a spring member, said receptacle member having an axially extending bore adapted to receive said stud member and said receptacle having a longitudinally extending slot intersecting said bore and adapted to loosely receive a central portion of said spring member, said stud member having cam locking means adapted to engage said central portion of said spring member, said spring member having looped end portions disposed outside said slot to present U-shaped portions having terminal ends disposed crosswise of said central portion, and said ends being spring biased to bear against edge portions of said slot when said central portion of said spring is cammed inwardly of said slot by said stud member.

2. A fastener assembly according to claim 1 wherein said U-shaped portions are disposed on opposite sides of the axis of said central portion with said terminal ends in the form of straight lengths disposed transversely with respect to said slot for engagement with the end surface of said receptacle member to thereby position said central portion at the correct depth within said slot for cam action engagement by said stud member.

References Cited in the file of this patent

UNITED STATES PATENTS

| | | |
|---|---|---|
| 2,148,160 | Hollerith | Feb. 21, 1939 |
| 2,186,747 | Albin | Jan. 9, 1940 |
| 2,421,204 | Jung | May 27, 1947 |
| 2,424,603 | Dzus | July 29, 1947 |
| 2,513,553 | Dzus | July 4, 1950 |
| 2,818,626 | Ralph et al. | Jan. 7, 1958 |